United States Patent
A'Rafat et al.

(10) Patent No.: US 7,483,705 B2
(45) Date of Patent: Jan. 27, 2009

(54) SYSTEM AND METHOD FOR INPUTTING LOCATION COORDINATES INTO FIXED POSITION REFERENCE DEVICES USED IN GEO-LOCATION APPLICATIONS

(75) Inventors: Sa'Ed A'Rafat, Winter Springs, FL (US); John M. Belcea, West Melbourne, FL (US); James Green, Winter Springs, FL (US); Philip J. Hill, Oviedo, FL (US); Allen M. Roberson, Altamonte Springs, FL (US); Jeffrey C. Schmidt, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 560 days.

(21) Appl. No.: 11/184,099

(22) Filed: Jul. 19, 2005

(65) Prior Publication Data
US 2007/0021123 A1    Jan. 25, 2007

(51) Int. Cl.
*H04Q 7/20*    (2006.01)
(52) U.S. Cl. ............ 455/456.1; 345/419; 700/98; 700/118; 700/182
(58) Field of Classification Search ............ 455/456.1; 345/419; 700/98, 118, 182
See application file for complete search history.

(56) References Cited

U.S. PATENT DOCUMENTS

| | | | |
|---|---|---|---|
| 5,729,680 A * | 3/1998 | Belanger et al. ............ 709/222 |
| 5,943,322 A | 8/1999 | Mayor | |
| 6,728,545 B1 | 4/2004 | Belcea | |
| 6,807,165 B2 | 10/2004 | Belcea | |
| 6,873,839 B2 | 3/2005 | Stanforth | |
| 7,164,883 B2 * | 1/2007 | Rappaport et al. ......... 455/3.01 |
| 2002/0058502 A1 | 5/2002 | Stanforth | |
| 2006/0029010 A1 | 2/2006 | Belcea | |

* cited by examiner

*Primary Examiner*—Temica M Beamer
(74) *Attorney, Agent, or Firm*—Randi L. Karpinia; Joseph J. Buczynski

(57) ABSTRACT

A system and method for providing geographic location information to of at least one fixed reference device in a wireless network, the method comprising: determining a geographic location of the at least one fixed reference device within an image, such as a Geographic Information System (GIS) image, where the GIS image comprises a plurality of pixels each having an absolute geographic location value associated with it, and where the geographic location of the at least one fixed reference device is defined with respect to the absolute position values associated with at least one pixel that is proximal to an image of the at least one fixed reference device within the GIS image; and providing the determined geographic location information to the at least one fixed reference device.

20 Claims, 3 Drawing Sheets

SYSTEM AND METHOD FOR INPUTTING LOCATION COORDINATES INTO FIXED POSITION REFERENCE DEVICES USED IN GEO-LOCATION APPLICATIONS

BACKGROUND OF THE INVENTION

1. Field of the Invention

The present invention relates to a system and method for inputting location coordinates into the memory of at least one fixed position reference device in an ad-hoc wireless communications network. More particularly, the present invention relates to a system and method for computing the location of at least one fixed position reference device in a wireless communications network, such as an ad-hoc multihopping wireless communications network, and loading the computed geographic location coordinates into the memory of the at least one fixed position reference device, using a graphical mapping scheme.

2. Description of the Related Art

Wireless communication networks, such as mobile wireless telephone networks, have become increasingly prevalent over the past decade. In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,873,839 entitled "Prioritized-Routing for an Ad-Hoc, Peer-to-Peer, Mobile Radio Access", issued on Mar. 29, 2005, and in U.S. Pat. No. 6,807,165, the entire content of each being incorporated herein by reference.

In conventional wireless communications networks, and in ad-hoc wireless communications networks, it is often necessary or desirable for a user terminal to be capable of knowing or determining its geographic location. Different types of location determining services and techniques for wireless communications networks, in this regard, are described, for example, in U.S. Pat. No. 6,728,545, the entire contents of which are incorporated herein by reference. Moreover, the '545 patent discloses a MEA™ wireless geo positioning system that is capable of determining the location of network nodes within a wireless network boundary using time of flight measurement and multilateration techniques. This geographic positioning system requires the use of several geographic reference routers to be used as position references, wherein the routers are located at fixed locations with known Geographic Information System (GIS) coordinates.

The geographical coordinates of references can be retrieved from GPS devices, in places where GOS Signals can be received, or are computed based on positions of the reference devices relative to other references with known geographical location. After the geographical positions are known, the coordinates are entered into the memory of the reference device using a user interface.

A need remains, however, for an improved method of inputting Geographical Information System (GIS) coordinates into fixed position reference devices in the context of determining the location of network nodes within a wireless communications network that substantially eliminate the drawbacks associated with existing systems and methods.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
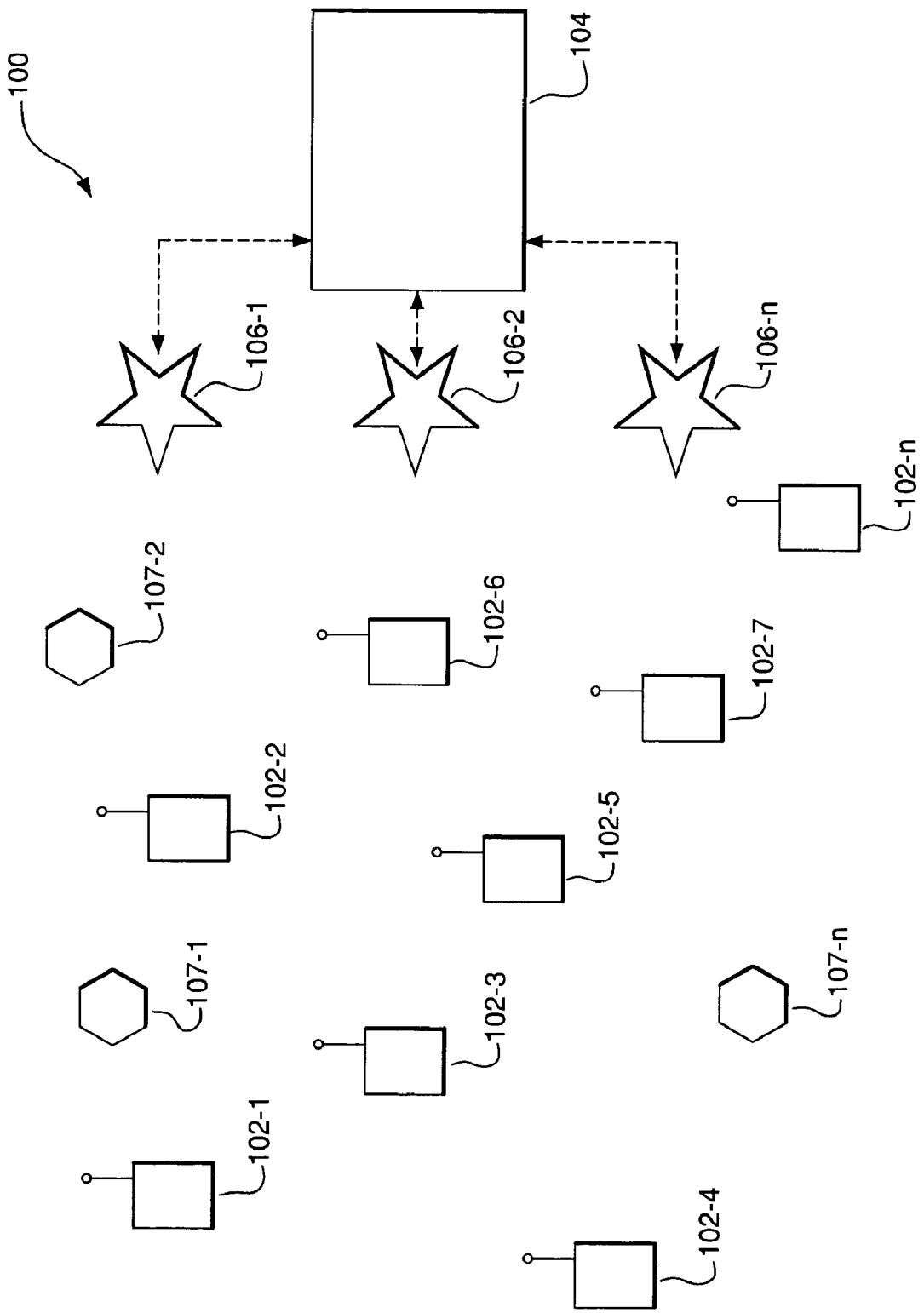
FIG. 1 is a block diagram of an example ad-hoc wireless communications network including a plurality of devices employing a system and method in accordance with an embodiment of the present invention.

FIG. 1 is a block diagram illustrating an example of an ad-hoc packet-switched wireless communications network 100 employing an embodiment of the present invention. Specifically, the network 100 includes a plurality of user terminals 102-1 through 102-n (referred to generally as mobile devices 102) and can, but is not required to, include a fixed network 104 having a plurality of access points 106-1, 106-2, . . . 106-n (referred to generally as nodes 106 or access points 106), for providing devices 102 with access to the fixed network 104. The fixed network 104 can include, for example, a core local access network (LAN), and a plurality of servers and gateway routers to provide network devices with access to other networks, such as other ad-hoc networks, the public switched telephone network (PSTN) and the Internet. The network 100 further can include a plurality of fixed routers 107-1 through 107-n (referred to generally as fixed terminals 107, fixed position devices 107, fixed reference devices 107, or fixed position reference devices 107). These terminals can be fixed position devices or routers for use as position references having known Geographic Information System (GIS) coordinates. It is noted that for purposes of this discussion, the devices discussed above can be collectively referred to as "devices 102, 106, and 107", or simply "devices" or "nodes".

As can be appreciated by one skilled in the art, the devices 102, 106 and 107 are capable of communicating with each other directly, or via one or more other devices 102, 106 or 107 operating as a router or routers for packets being sent between devices, as described in U.S. Pat. No. 6,807,165 and in U.S. Pat. Nos. 7,072,650 and 6,873,839, referenced above.

Figure 2:
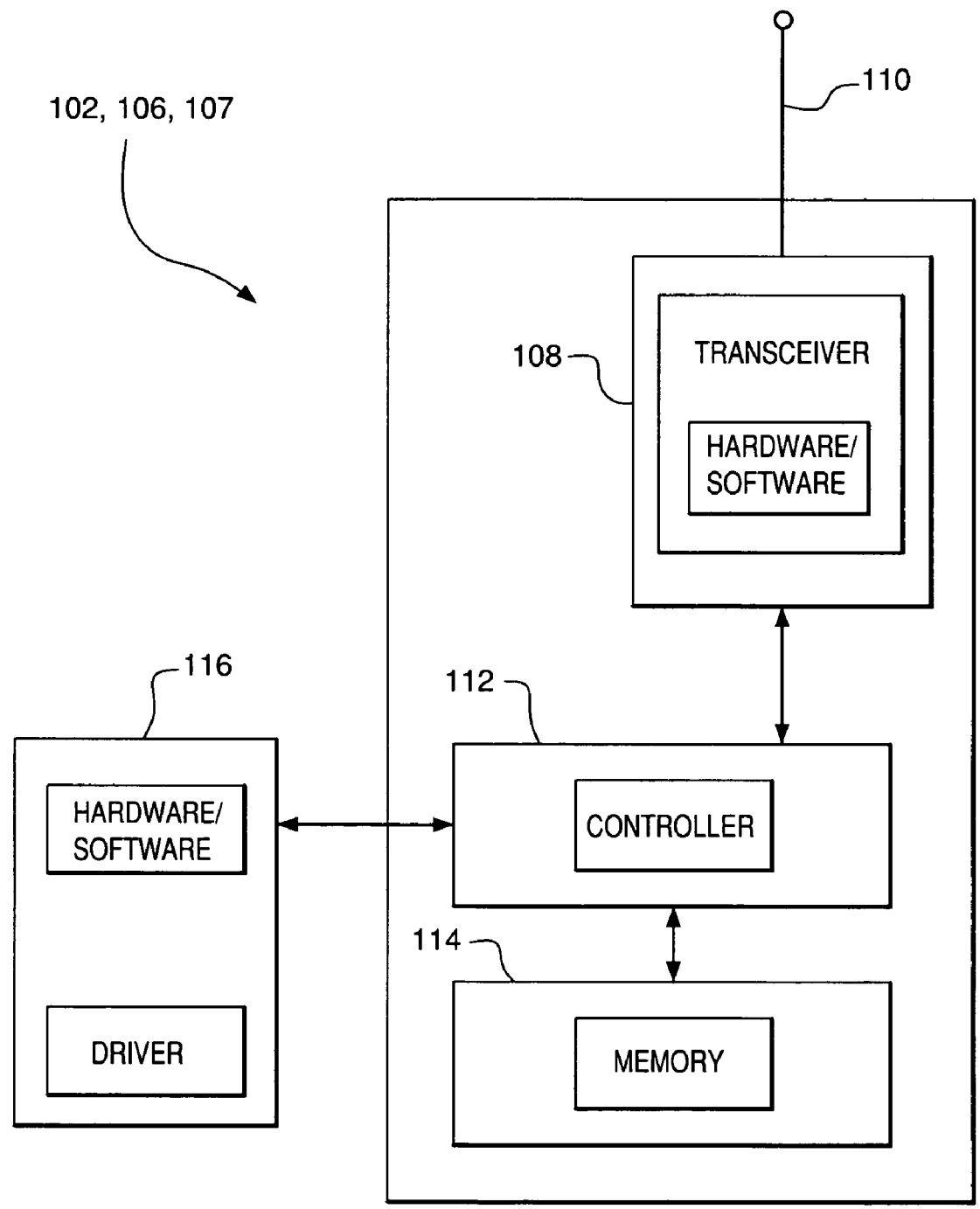
FIG. 2 is a block diagram illustrating an example of a device employed in the network shown in FIG. 1.

As shown in FIG. 2, each device 102, 106 and 107 includes a transceiver, or modem 108, which is coupled to an antenna 110 and is capable of receiving and transmitting signals, such as packetized signals, to and from the device 102, 106 or 107, under the control of a controller 112. The packetized data signals can include, for example, voice, data or multimedia information, and packetized control signals, including node update information.

Each device 102, 106 and 107 further includes a memory 114, such as a random access memory (RAM) that is capable of storing, among other things, routing information pertaining to itself and other devices in the network 100. As further shown in FIG. 2, certain devices, especially mobile devices 102, can include a host 116 which may consist of any number of devices, such as a notebook computer terminal, mobile telephone unit, mobile data unit, or any other suitable device. Each device 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As will now be discussed in more detail, the present invention provides a system and method for providing geographic location information of at least one fixed reference device in a wireless network. The system and method operate to determine the geographic location of at least one fixed reference device within a Geographic Information System (GIS) image, such that the GIS image comprises a plurality of pixels each having an absolute geographic location value associated with it, and wherein the geographic location of the fixed reference device or devices is defined with respect to the absolute position values associated with at least one pixel that is proximal (e.g., is in closet proximity within the GIS image) to the fixed reference device or devices within the GIS image.

The system and method further operate to inform each fixed reference device of its respective geographic location by sending each respective device a respective message comprising the respective geographic location information, such that each fixed reference device stores the geographic location information in its memory.

Each fixed reference device 107 is capable of communicating with at least one mobile device 102 directly, or via one or more other mobile devices 102 and/or other fixed reference devices 107 which operate as a router or routers for data packets being sent between mobile devices 102 or fixed position devices 107, as described, for example, in U.S. Patent Application Published No. 20060029010, U.S. Pat. No. 7,072,650, U.S. Pat. No. 5,943,322, U.S. Pat. No. 6,728,545, and U.S. Pat. No. 6,807,165, all of which are incorporated herein by reference. In particular, for example, each fixed reference device 107 and mobile device 102 can include a transceiver which is capable of receiving and transmitting signals, such as packetized data signals, to and from itself under the control of a controller. The packetized data signals can include, for example, voice, data or multimedia. In one embodiment, the system and method can utilize MEA™ wireless technology that employs a plurality of wireless transceivers (such as the MeshNetworks™ WMC6300 wireless transceiver) and wireless ad-hoc, scalable routing technologies, as described, for example, in U.S. Pat. No. 6,728,545.

Figure 3:
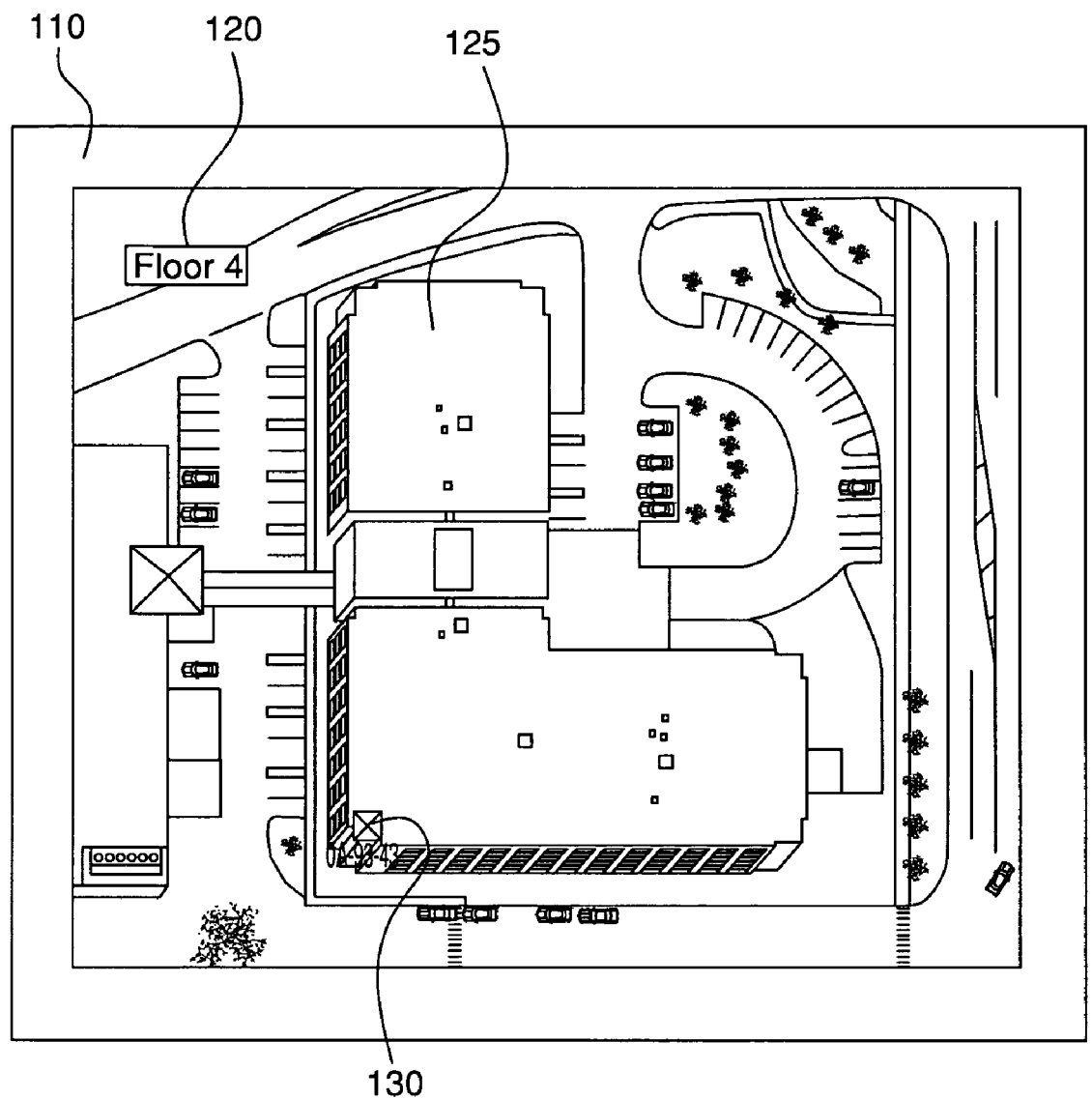
FIG. 3 is an example of a Geographic Information System (GIS) image that can be displayed on the screen of a dispatcher device, which includes an image of a building as well as a geographic location indicator box displaying the geographic location coordinates of a fixed reference device shown in FIG. 1.

The Geographic Information System (GIS) image used in the context of the system and method of the present invention comprises a plurality of pixels each having an absolute geographic location value associated with it within the GIS image. FIG. 3 illustrates an example GIS image 120 (as displayed on a dispatcher device 110) comprising the image of an "L-shaped" building 125 having a geographic position indicator box 130 for a fixed reference device 107 situated therein. In this regard, a GIS image 120 can be used in order to accurately assess or define the geographic location of a fixed reference device 107. Moreover, a determination can be made as to where at least one fixed reference device 107 is situated or located within the GIS image 120.

In one embodiment of the present invention, a "member" of a team situates, deploys, or installs at least one fixed reference device 107 at a site, as described, for example, in U.S. Patent Application Published No. 20060029010, referenced above, while a "leader" of the team remains outside the operating field and directs the member based on information provided to him, for example, by a dispatcher device 110 upon with the GIS image is visible. A dispatcher device 110, in this regard, can be a software component installed on a laptop computer with a MEA™ WMC 6300™ interface, which shows the position of deployed fixed reference devices 107 within a GIS image 120 (visible, for example, on a dispatcher device 110) when the fixed reference device is "powered on". Moreover, a dispatcher device 110 can be any suitable device, such as, for example, a mobile device 102 having the capacity to exhibit a GIS image 120. The leader, in this regard, is preferably in continuous radio connection with his team. Moreover, when at least one fixed position device 107 is deployed on a particular floor of a building, for example, the leader can enter the floor number where the device is deployed into the geographic information stored in the dispatcher device 110, which then is sent to the at least one fixed reference device 107, as described, for example, U.S. Patent Application Published No. 20060029010, referenced above.

In another embodiment, the leader of a team can provide instructions to a member as to where at least one fixed reference device 107 is to be deployed, by placing at least one geographic location indicator box 130 into a GIS image 120 (visible, for example, on a dispatcher device 110) at one or more desired locations using, for example, "drag and drop" functionality, wherein the geographic location indicator box 130 comprises geographic location coordinates for the fixed reference device 107 which appear in or near the geographic location indicator box 130 on the screen of the dispatcher device that is viewable by the leader, and which are communicated via the network 100 to the dispatcher devices 110 that are being used by the members. It should noted that the dispatcher devices 110 are capable of communicating in the network 100 in a manner similar to nodes 102, 106 and 107 as discussed above. In this regard, a member can then deploy the fixed reference device 107 to the desired geographic location, and the dispatcher device 110 can send the geographic location information (e.g., geographic location coordinates) to a fixed reference device 107, when the fixed reference device 107 is "powered on". An association can be made, in this regard, between a fixed reference device ID and the GIS location as determined by the placement of the fixed reference device 107 and the closest pixel. The application can generate a message that includes the fixed reference device ID and the geographic location, as computed from the pixel position on the GIS image 120. The message can then be sent from the dispatcher device 110 used by the team leader, for example, to the fixed reference device, via the ad-hoc multihopping wireless communications network 100, so that the message commands the fixed reference device 107 to be loaded with the computed GIS location.

The fixed reference device 107 preferably confirms its receipt of information pertaining to its geographic location from the dispatcher device 110, by sending a confirmation message to the dispatcher device 110, wherein the dispatcher device 110 registers the confirmed receipt by the fixed reference device 107 of its geographic location, for example, by changing the color of the geographic location indicator box 130 corresponding to that fixed reference device 130 to a color that is different from its original color (e.g., from an original color of yellow to a "confirmed"-indicating color of green).

The fixed reference device 107 preferably includes a memory, such as a random access memory (RAM) that is capable of storing, among other things, the geographic location coordinates of the fixed reference device 107, the geographic location coordinates of at least one other fixed reference device 107, and/or the geographic location coordinates of at least one mobile device 102, as well as routing information pertaining to itself and other mobile devices 102 and fixed reference devices 107 in the network 100. The mobile devices 102 and fixed reference devices 107 can exchange their respective routing information and can store all or a relevant portion of such routing information (e.g., in the form of a routing table), as described, for example, in U.S. Pat. No. 6,728,545, which is incorporated herein by reference. In addition, mobile devices 102 and fixed reference devices 107 in the network 100 can have the capability to measure with high precision the propagation time of radio signals between the devices 102 and 107. Based on this information and the stored geographic location coordinates of fixed reference devices 107, mobile devices 102 can compute their own locations, as described, for example, in U.S. Pat. No. 6,728,545.

The fixed position devices 107 can periodically broadcast location messages communicating their location to mobile terminals 102 and to other fixed terminals 107 within their RF range. Each mobile terminal 102 that can receive the location messages from other fixed terminals 107 or mobile terminals 102 can compute their positions using the fixed position device's location, and even broadcast subsequent location messages communicating its position to other member of the network 100, such as to mobile devices 102 and other fixed position devices 107, in any suitable manner, such as described, for example, in U.S. Pat. No. 6,728,545 and U.S. Pat. No. 6,807,165, both referenced above.

Accordingly, the technique described above provides an improved method of inputting GIS coordinates into fixed position reference devices in the context of determining the location of network nodes within a wireless communications network that substantially eliminate the drawbacks associated with existing systems and methods.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for deploying at least one fixed reference device in a wireless network, the method comprising:
   specifying a geographic location for deployment of the at least one fixed reference device by defining at least one location within a geographic information system (GIS) image for placement of a representation image of the at least one fixed reference device, wherein the GIS image comprises a plurality of pixels each having an absolute geographic location value associated therewith, such that the geographic location information pertaining to the at least one fixed reference device is defined with respect to at least one said absolute geographic location value associated with at least one pixel that is proximate to the representation image of the at least one fixed reference device within the GIS image;
   deploying the at least one fixed reference device to the specified geographic location; and
   providing the geographic location information pertaining to the at least one deployed fixed reference device to the at least one deployed fixed reference device.

2. The method of claim 1, further comprising:
   displaying the GIS image and the representation image of the at least one fixed reference device on at least one dispatcher device.

3. The method of claim 1, wherein:
   the specifying step comprises specifying the geographic location for deployment of the at least one fixed reference device by defining at least one location within the GIS image displayed on a first dispatcher device for placement of the representation image of the at least one fixed reference device; and
   the deploying step comprises deploying the at least one fixed reference device to the at least one specified geographic location based on the GIS image and the representation image of the at least one fixed reference device as displayed on at least one second dispatcher device.

4. The method of claim 2, wherein:
   the providing step comprises providing the geographic location information pertaining to the at least one deployed fixed reference device to the at least one deployed fixed reference device from the at least one dispatcher device viewable by the operator.

5. The method of claim 4, comprising:
   operating the at least one fixed reference device to confirm receipt of the geographic location information by sending a confirmation message to the at least one dispatcher device.

6. The method of claim 5, further comprising:
   operating the at least one dispatcher device to inform an operator of the confirmed receipt by the at least one fixed reference device of the geographic location information.

7. The method of claim 1, further comprising:
   operating the at least one fixed reference device to store the geographic location information in a memory.

8. The method of claim 4, further comprising:
   operating the at least one dispatcher device to store information pertaining to the identity of the at least one fixed reference device and the geographic location information in a memory.

9. The method of claim 1, further comprising:
   operating the at least one fixed reference node to periodically broadcast messages including information pertaining to its geographic location.

10. The method of claim 1, wherein:
    the determining step comprises determining respective geographic locations of each of a plurality of fixed reference devices;
    the deploying step comprises deploying each of the fixed reference devices to their respective specified geographic locations; and
    the providing step comprises providing the determined geographic location information to each of the plurality of deployed fixed reference devices.

11. The method of claim 1, wherein the wireless network includes an ad-hoc multi-hopping network, and wherein the at least one fixed reference device communicates in the ad-hoc multi-hopping network.

12. A system for deploying at least one fixed reference device in a wireless network, the system comprising:
    at least one fixed reference device; and at least one dispatcher device adapted to display a geographic information system (GIS) image comprising a plurality of pixels each having an absolute geographic location value associated therewith, and being further adapted to enable specification of a geographic location of the at least one fixed reference device within the GIS image so that the geographic location of the at least one fixed reference device is defined with respect to at least one absolute geographic location value associated with at least one pixel that is proximate to a representation image of the at least one fixed reference device within the GIS image, and to provide information pertaining to the geographic location of the at least one fixed reference device to enable an operator to deploy the at least one fixed reference device to the specified geographic location based on the geographic location information that is provided to the at least one fixed reference device.

13. The system of claim 12, wherein the at least one fixed reference device is adapted to confirm receipt of the geographic location information by sending a confirmation message to the at least one dispatcher device.

14. The system of claim 13, wherein the at least one dispatcher device is further adapted to inform an operator of the confirmed receipt by the at least one fixed reference device of the geographic location information.

15. The system of claim 12, wherein the at least one fixed reference device is further adapted to store the geographic location information in a memory.

16. The system of claim 12, wherein the at least one dispatcher device is further adapted to store information pertaining to the identity of the at least one fixed reference device and the geographic location information in a memory.

17. The system of claim 12, wherein the at least one fixed reference node is further adapted to periodically broadcast messages communicating its geographic location to other terminals.

18. The system of claim 12, wherein the at least one dispatcher device is adapted to enable specification of geographic locations of each of a plurality of fixed reference devices within the GIS image, and to provide respective information pertaining to the respective fixed reference devices to the fixed reference devices to enable an operator to deploy each of the fixed reference devices to the respective specified geographic locations.

19. The system of claim 18, wherein the at least one dispatcher device is further adapted to store information pertaining to the identities of each of the plurality of fixed reference devices and the respective geographic location information in a memory.

20. The system of claim 12, wherein the wireless network includes an ad-hoc multi-hopping network, and wherein the at least one fixed reference device is adapted to communicate in the ad-hoc multi-hopping network.

\* \* \* \* \*